(12) United States Patent
Smith et al.

(10) Patent No.: US 7,095,849 B2
(45) Date of Patent: Aug. 22, 2006

(54) INTEGRATED FILTER AND MODULAR JACK FOR VOICE OVER DIGITAL SUBSCRIBER LINE SERVICE

(75) Inventors: Donald Smith, Vinemont, AL (US); Steven Ryals, Pinson, AL (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 85 days.

(21) Appl. No.: 10/888,213

(22) Filed: Jul. 9, 2004

(65) Prior Publication Data

US 2006/0008061 A1    Jan. 12, 2006

(51) Int. Cl.
*H04M 11/06* (2006.01)
(52) U.S. Cl. .................. 379/413.04; 379/93.05
(58) Field of Classification Search ........... 379/413.04, 379/93.05–93.07; 370/488
See application file for complete search history.

(56) References Cited

U.S. PATENT DOCUMENTS 6,560,319 B1* 5/2003 Binder .................. 379/399.01

2002/0111077 A1* 8/2002 Keenum .................. 439/676
2002/0196908 A1* 12/2002 Hollenbeck et al. ....... 379/1.04

* cited by examiner

Primary Examiner—Daniel Swerdlow
(74) Attorney, Agent, or Firm—Merchant & Gould, LLC

(57) ABSTRACT

An integrated filter and modular jack for filtering a voice signal delivered over a digital subscriber line between a first communication circuit and a second communication circuit where the voice signal includes analog and digital portions. The modular filter jack includes a connector for receiving the voice signal from a first communication circuit, a high pass filter, and/or a low pass filter. The high pass filter includes a capacitor operatively associated with the connector to block the analog portion of the voice signal while passing the digital portion. The low pass filter includes an inductor operatively associated with the connector to block the digital portion of the voice signal while passing the analog portion. The modular filter jack also includes a receptacle operatively associated with the high pass filter and/or the low pass filter for receiving a connection element to make electrical contact between the first and second communication circuits.

13 Claims, 9 Drawing Sheets

INTEGRATED FILTER AND MODULAR JACK FOR VOICE OVER DIGITAL SUBSCRIBER LINE SERVICE

TECHNICAL FIELD

The present invention relates to voice filtering. More particularly, the present invention relates to filtering voice signals delivered over digital subscriber lines.

BACKGROUND

The advent of high-speed Internet connections along existing telephone lines, where both voice communication and digital communication are operative, has resulted in the need for filters that will block signal interferences at high frequencies. The digital subscriber line (DSL) portion of a voice over digital subscriber line (VODSL) signal can cause garbled communication on a plain old telephone system (POTS) telephone. Similarly, telephone activity utilizing unfiltered signals can interrupt DSL service while in use with a computer.

When an end user orders VODSL service, inline filters must be used at the end user's premises to separate the DSL portion from the POTS portion. Multiple inline filters are sent to the end user in response to a VODSL order. Each of these conspicuous inline filters must be plugged into a wall jack and the end user's equipment is plugged into the inline filter. The need for the inline filters has resulted in unsightly external filters, or filters that form part of a permanent connector wall jack bracket for a wall jack and require installation of the new jack bracket using screw terminals after removal of the existing bracket.

In many instances, conversion to VODSL takes several days while awaiting arrival of these unattractive filters. After installation, subsequent use of a phone line necessitates the use of unsightly filters protruding or hanging from existing wall jacks.

It is with respect to these and other considerations that the present invention has been made.

SUMMARY

Exemplary embodiments of the present invention address these problems and others by providing an integrated filter and modular jack for filtering voice signals delivered over a digital subscriber line. According to an exemplary embodiment, a high pass filter and/or a low pass filter are added to an existing modular jack to produce a modular filter jack that designates what services are passed and what services are blocked. Once a modular filter jack is in place and the voice over digital subscriber line (VODSL) service is provisioned and established, digital, e.g., DSL, and analog, e.g., POTS services are usable almost immediately without the use of any additional and/or unattractive equipment. Certain embodiments of the present invention may send both portions of a VODSL signal to a corresponding receptacle or adapter, while other embodiments will only send the designated signal portion. Additionally, certain embodiments may include a selector switch that allows the user to designate the portion of the VODSL signal that is passed and/or blocked.

One exemplary embodiment of the present invention includes a modular filter jack for blocking a POTS portion and/or a DSL portion of a VODSL signal and for receiving one or more plugs to make electrical contact between communication circuits. The modular filter jack includes a connector for receiving the VODSL signal from a first communication circuit. The modular filter jack also includes a high pass filter and/or a low pass filter. The high pass filter has one or more capacitors operatively associated with the connector to block the POTS portion of the VODSL signal while passing the DSL portion. In contrast, the low pass filter has one or more inductors operatively associated with the connector to block the DSL portion of the VODSL signal while passing the POTS portion.

The modular filter jack further includes a receptacle operatively associated with the high pass filter and/or the low pass filter. The receptacle may receive a plug to make electrical contact between the first communication circuit and a second communication circuit.

Another exemplary embodiment of the present invention includes an apparatus for blocking a DSL portion of a VODSL signal. The apparatus includes an integrated filter and modular jack. The integrated filter and modular jack has a connector for receiving the VODSL signal from a central communications circuit, and a low pass filter. The low pass filter includes one or more inductors for receiving the VODSL signal and blocking the DSL portion of the signal. The integrated filter and modular jack further includes a receptacle operatively associated with the low pass filter for receiving a POTS portion of the VODSL signal and for receiving a plug connecting a communications device to the central communications circuit.

Still another exemplary embodiment of the present invention includes a method for filtering a POTS portion and/or a DSL portion of a VODSL signal. The method involves providing a modular filter jack with a selectable mechanism. The modular filter jack provided includes a connector for receiving the VODSL signal from a first communication circuit, a high pass filter and a low pass filter. The high pass filter includes one or more capacitors operatively associated with the connector to block the POTS portion of the VODSL signal while passing the DSL portion. The low pass filter includes one or more inductors operatively associated with the connector to block the DSL portion of the VODSL signal while passing the POTS portion. The modular filter jack also includes a receptacle operatively associable with the high pass filter and/or the low pass filter and a selector mechanism. The selector mechanism is operatively associated with the high pass filter and the low pass filter and selectably operative to electrically connect the receptacle to the high pass filter and/or the receptacle to the low pass filter. The method further involves placing the selector mechanism in electrical contact with the receptacle therein, electrically connecting the receptacle to the high pass filter and/or the low pass filter.

These and various other features as well as advantages, which characterize the present invention, will be apparent from a reading of the following detailed description and a review of the associated drawings. It is intended that all such additional features and advantages be included within this description, be within the scope of the present invention and be protected by the accompanying claims.

BRIEF DESCRIPTION OF THE DRAWINGS

The invention will be further understood from the following description with reference to the accompanying drawings, in which.

DETAILED DESCRIPTION

Exemplary embodiments of the present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
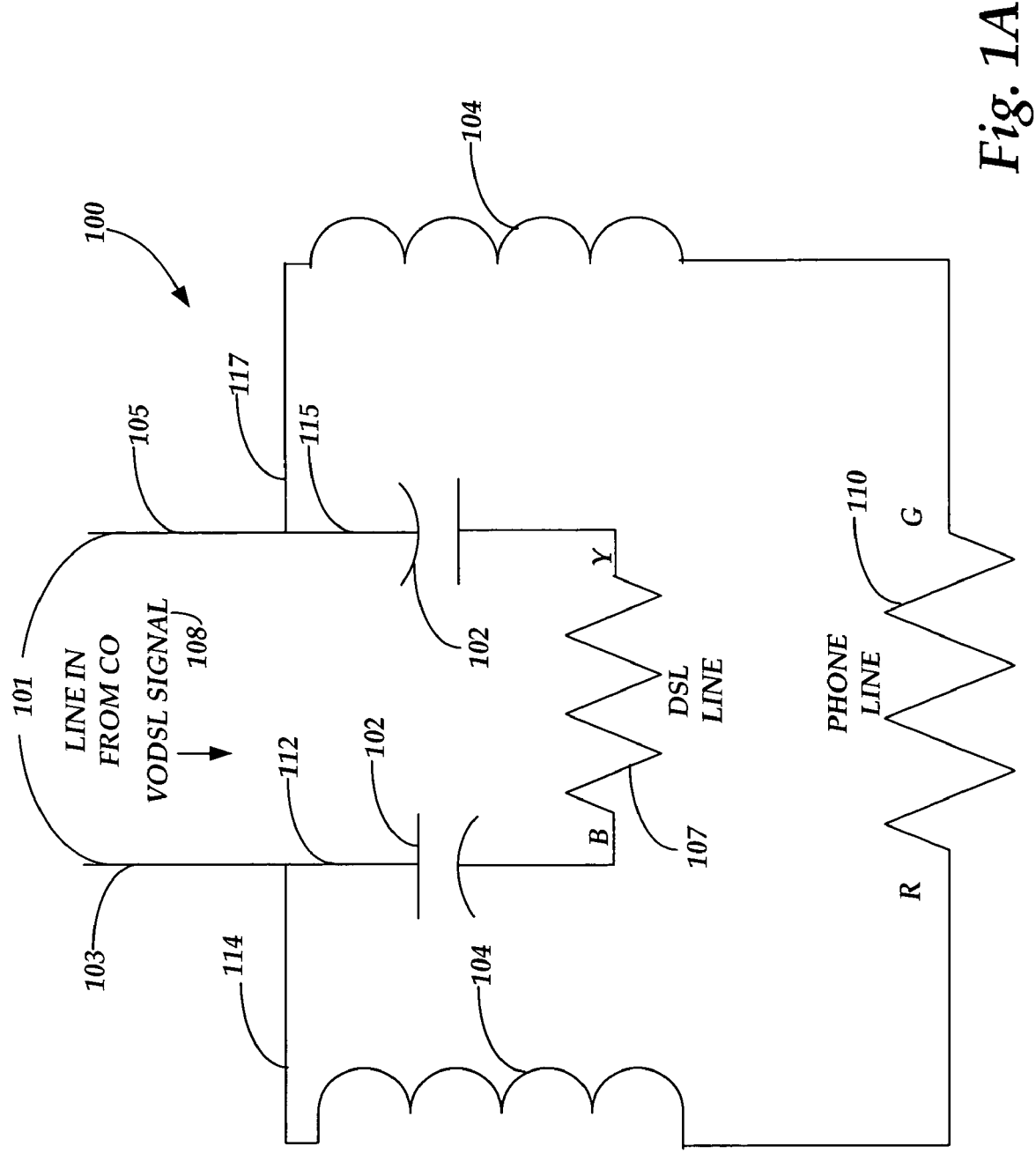
FIGS. 1A–1B are respectively a circuit diagram of modular filter jack circuitry and a top view of a modular filter jack utilized in a first exemplary embodiment of the present invention.

In FIG. 1A a circuit diagram of modular filter jack circuitry 100 utilized in exemplary embodiments of the present invention is illustrated. A twisted pair transmission line 101 having two conductors 103 and 105 is connected between a central office (CO) and the modular filter jack circuitry 100. Each conductor respectively connects to two inside wires 112, 114 and 115, 117 of the circuit 100. According to one embodiment conductor 103 connects to inside wires 114 red (R) and 112 black (B). Conductor 105 connects to inside wires 115 yellow (Y) and 117 green (G).

Capacitors 102 are connected in series with the inside wires 112 and 115 and in operation serve as a high pass filter, passing the high frequency DSL portion of a VODSL signal 108 while blocking a POTS portion of the VODSL signal. The capacitors 102 react with less resistance to high frequencies. Thus, the higher frequency DSL portion of the VODSL signal 108 passes on inside wires 112 and 115 while the low frequency POTS portion of the VODSL signal 108 is blocked by the capacitors 102.

In contrast, inductors 104 are operatively associated with the inside wires 114 and 117 and in operation serve as a low pass filter, passing the low frequency POTS portion of the VODSL signal 108 while blocking the DSL portion of the signal 108. The inductors 104 react with less resistance to low frequencies. Thus, the lower frequency POTS portion of the VODSL signal 108 passes on inside wires 114 and 117 while the high frequency DSL portion of the VODSL signal is blocked by the inductors 102. Thus, a resistor 107 connected in series with the capacitors 102 represents a DSL line while a resistor 110 connected in series with the inductors 104 represents a phone line.

Figure 1B:
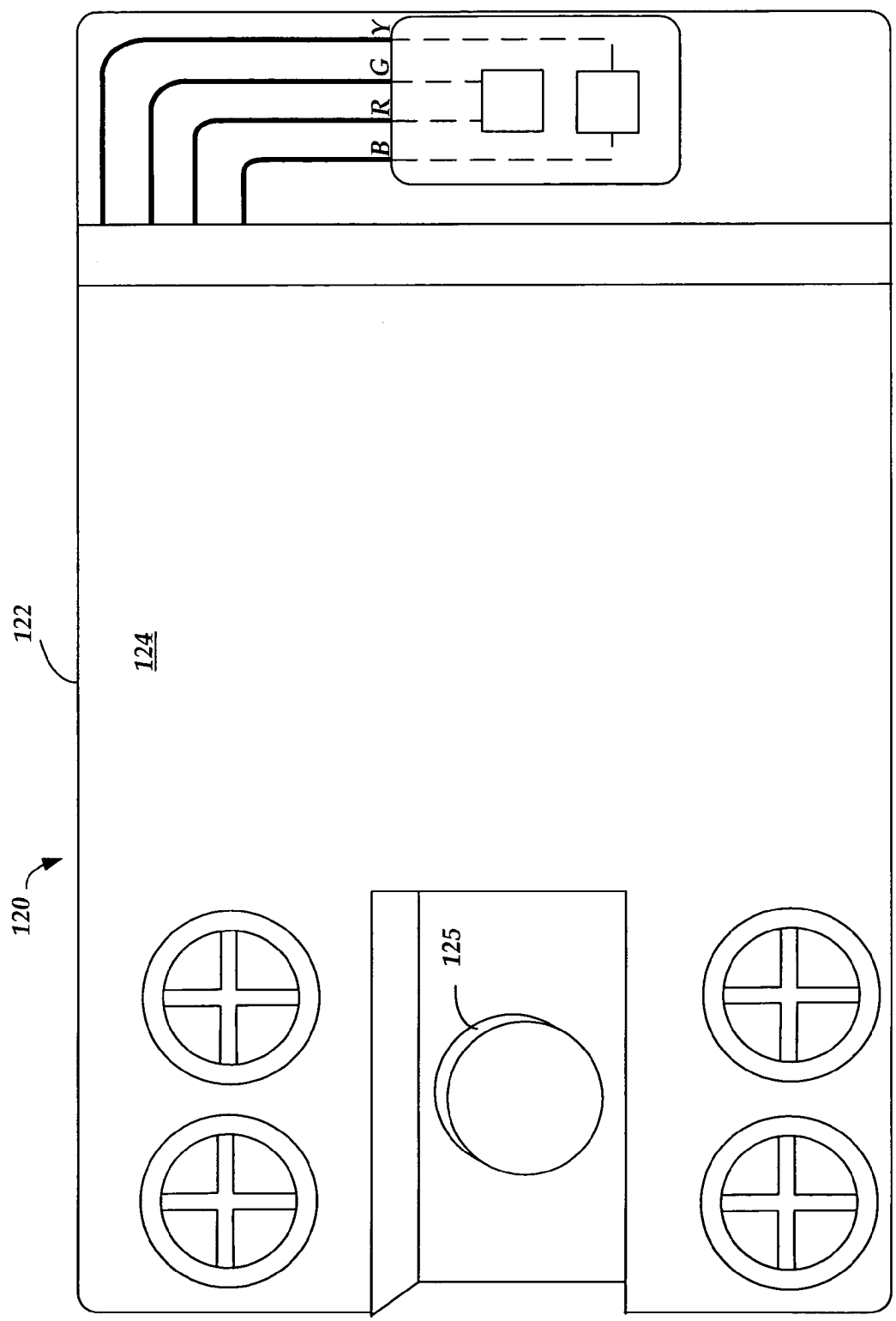

FIG. 1B is a top view of a modular filter jack 120 having a housing 122 that includes a top cover 124 and a hole 125 for use in mounting the housing 122 to a mounting surface.

Additional details regarding the internal components of a modular filter jack will be described below with respect to FIGS. 2A–5.

Figure 2A:
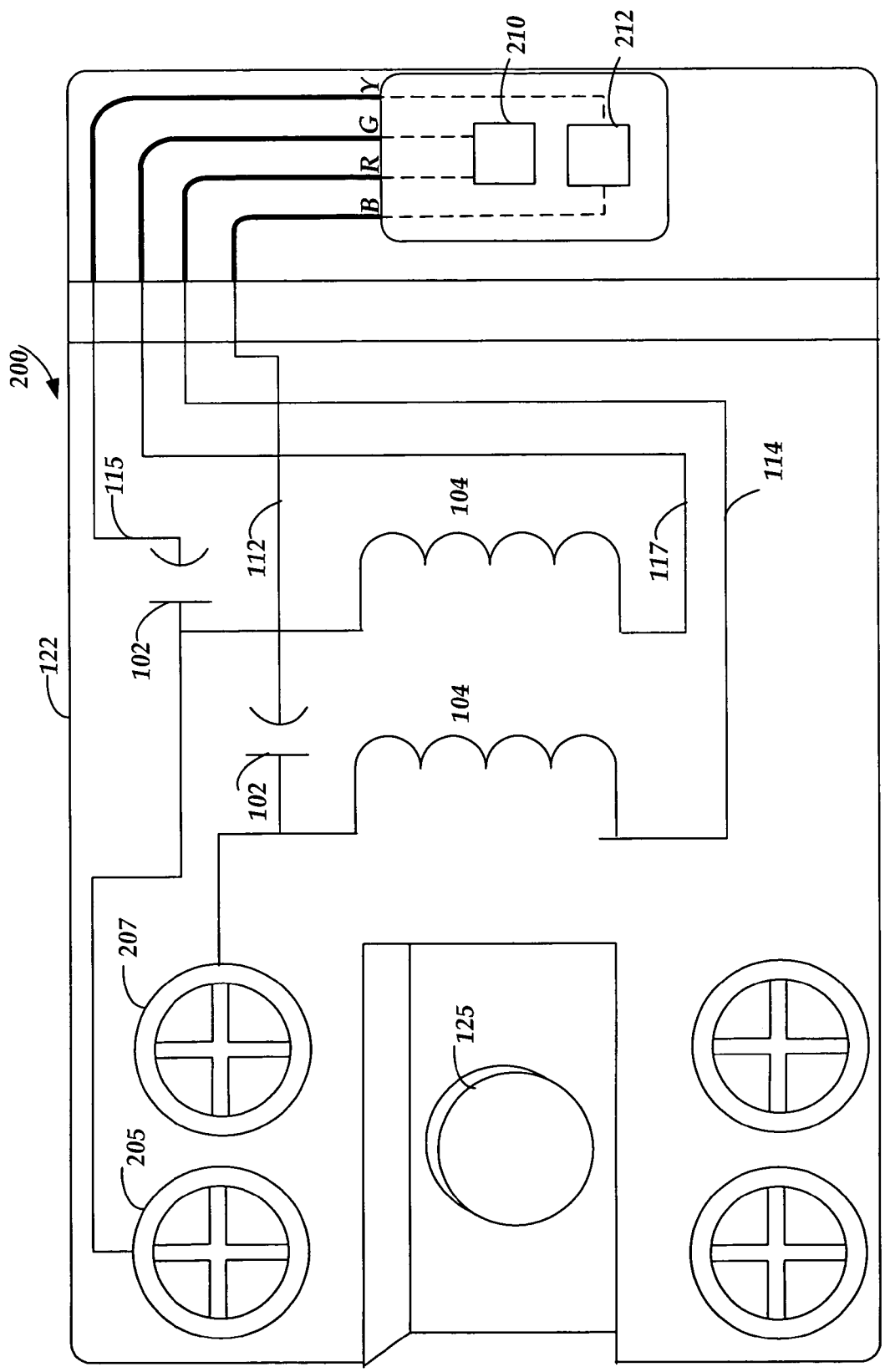
FIG. 2A is a top view of a modular filter jack operative to block and pass both DSL and POTS portions of a VODSL signal in accordance with another exemplary embodiment of the present invention, the top view shown as if a top cover is removed.

The modular filter jack 200 shown in FIG. 2A, shown as if the top cover is removed, includes the circuitry shown in FIG. 1A and further includes connectors 205 and 207 for receiving the VODSL signal from the central office on the line 101. The modular filter jack 200 also includes receptacles 210 and 212 for receiving plugs or connection elements electrically connecting or operatively associating computing devices and/or communication devices to or with the communication circuit from the central office. The receptacle 212 is in series with the capacitors 102 via the inside wires 112 and 115. Similarly, the receptacle 210 is in series with the inductors 104 via the inside wires 114 and 117. Thus, the modular filter jack 200 eliminates the need to plug a separate inline filter into an unfiltered jack in order to separate portions of the VODSL signal.

Figure 2B:
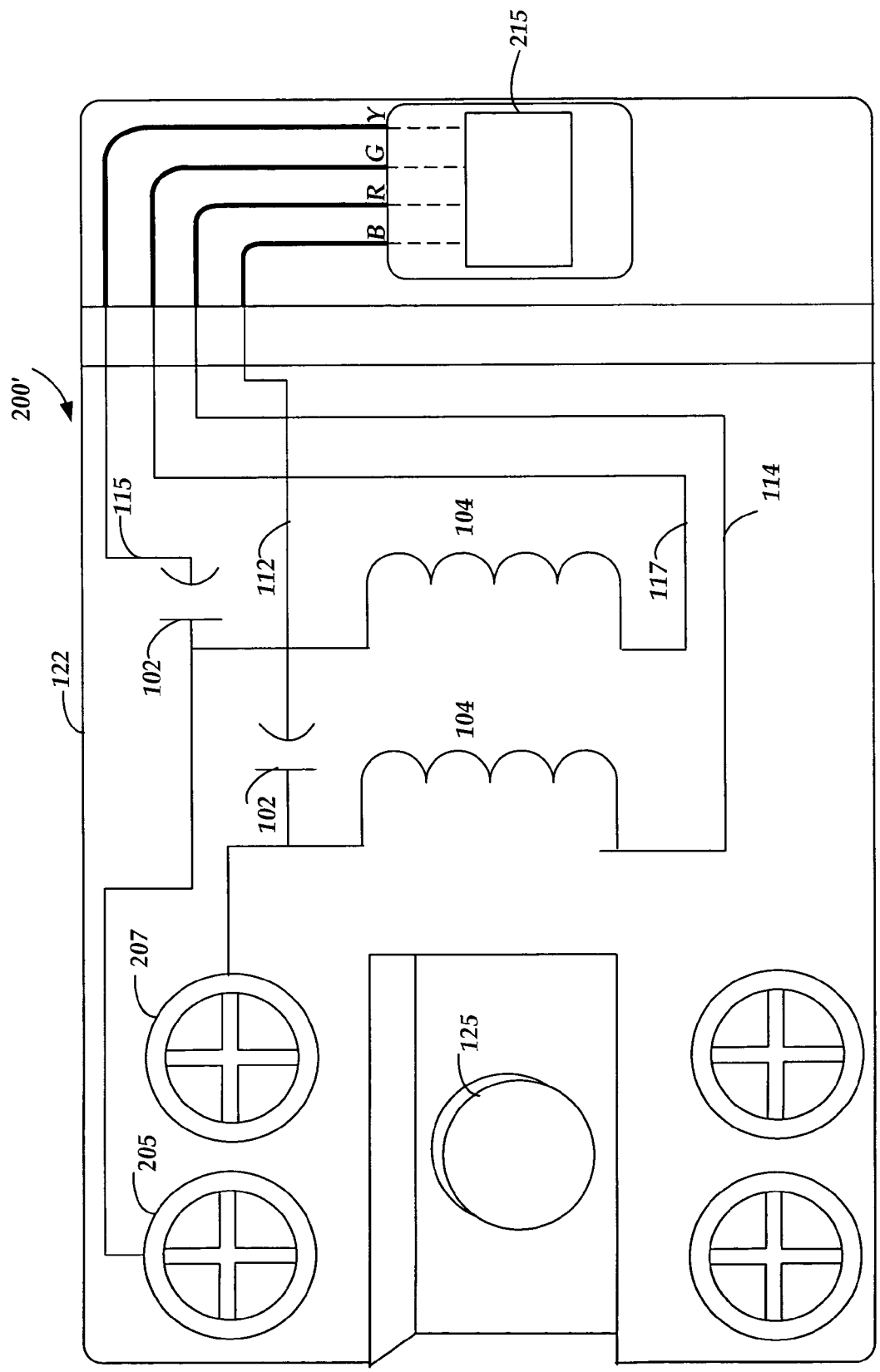
FIG. 2B is a modified exemplary embodiment (single four-wired receptacle) of the modular filter jack of FIG. 2A
Figure 2C:
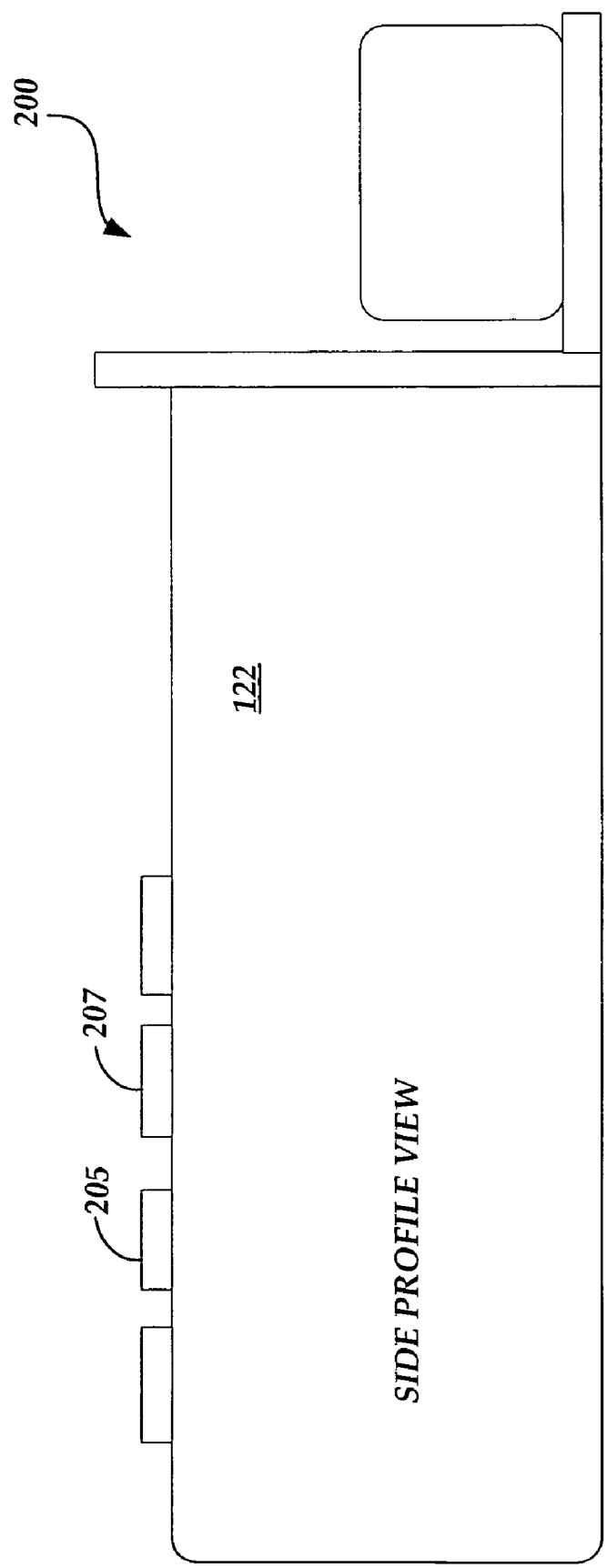
FIG. 2C is a side view of the modular filter jack shown in FIG. 2A.

The modular filter jack 200' shown in FIG. 2B is nearly identical to the modular filter jack shown in FIG. 2A with the exception of a receptacle 215. The receptacle 215 is a single receptacle in series with the inductors 104 (low pass filter) and the capacitors 102 (high pass filter) via the inside wires 112, 114, 115, and 117. The receptacle 215 receives the POTS portion of the VODSL signal via the inside wires 114 and 117. Similarly, the DSL portion of the VODSL signal is received at the receptacle 215 via the inside wires 112 and 115.

Figure 3A:
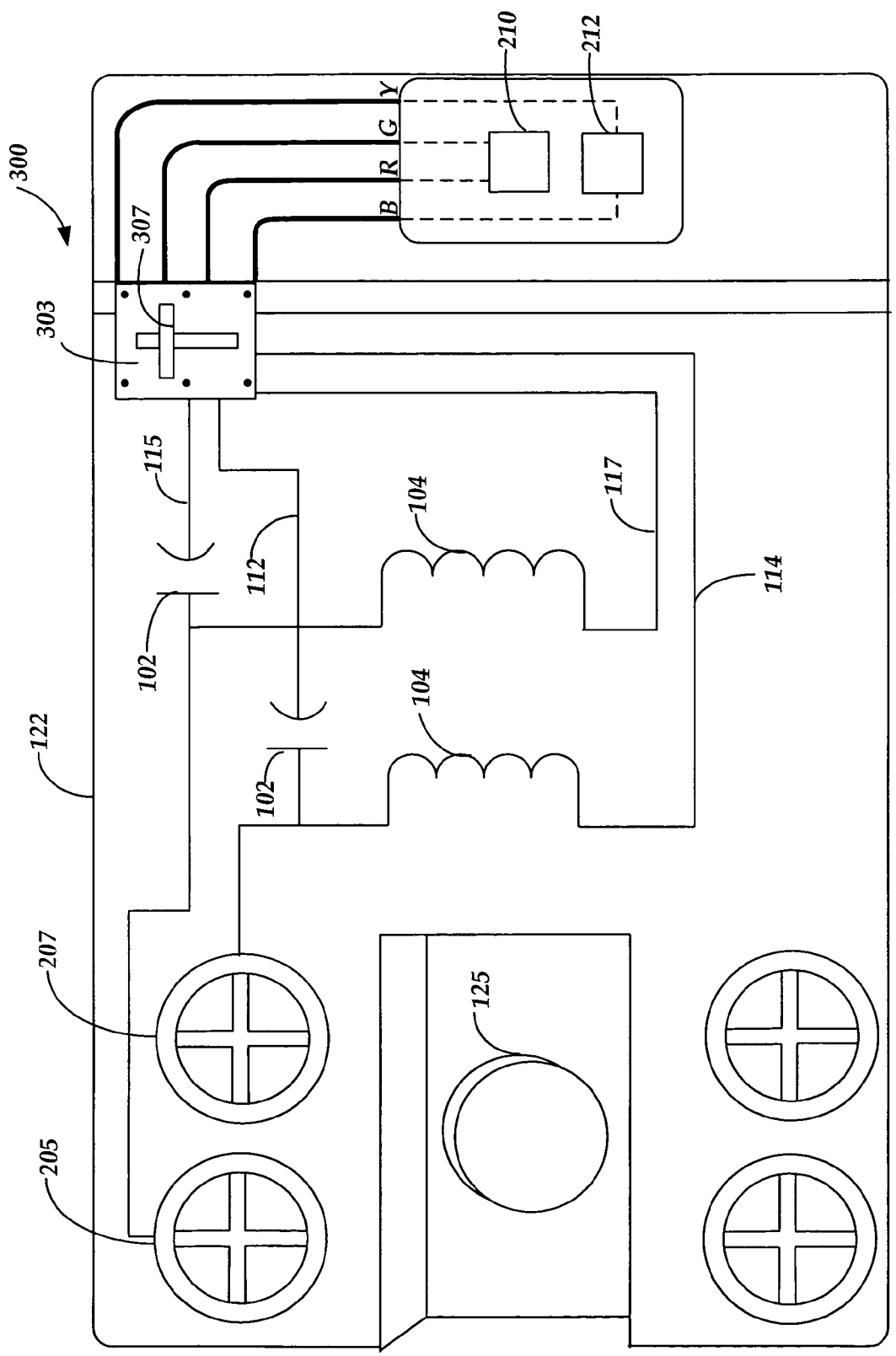
FIG. 3A is a top view of the modular filter jack of FIG. 2A having a selector mechanism.

The modular filter jack 300 shown in FIG. 3A includes the components as shown in FIG. 2A and further includes a selector mechanism 303. The selector mechanism 303 is operatively associated with the inductors 104 (low pass filter) and the capacitors 102 (high pass filter) via the inside wires 112, 114, 115, and 117. The selector mechanism 303 is also selectably operative to operatively associate the receptacle 210 with the capacitors 102 and the receptacle 212 with the inductors 104 thereby providing a selection choice depending on the needs of a user of the modular filter jack.

Figure 3B:
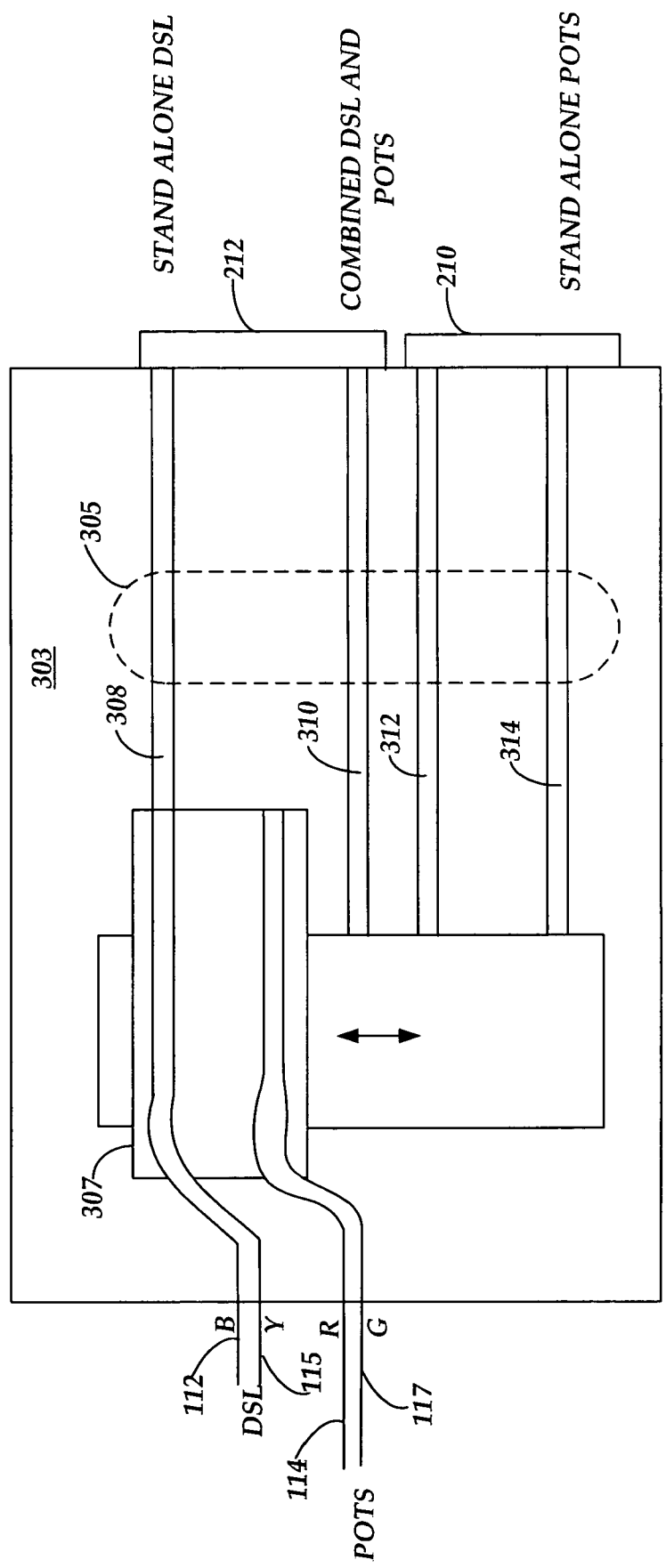
FIG. 3B is a back view of the selector mechanism of FIG. 3A in accordance with an exemplary embodiment of the present invention.

FIG. 3B is a back view of the selector mechanism 303 of FIG. 3A. The selector mechanism 303 includes a three-position selector switch 307 operatively associated with the inductors 104 and the capacitors 102 via the inside wires 112, 114, 115, and 117. The selector mechanism also includes connector wires 305 that are operatively associable with the inside wires 112, 114, 115, and 117 as the three-position selector switch 307 moves along the selector mechanism 303. For instance, in the uppermost position (as seen in FIG. 3B) of the selector switch 307 as the inside wires 112 and 115 make electrical contact with the connector wires 308, the DSL portion of the VODSL signal may flow through the selector mechanism 303 to the receptacle 212. However, no signal is connected to the POTS receptacle 210.

Similarly, as the selector switch 307 is changed to an intermediate position, where the inside wires 114 and 117 make electrical contact with the connector wires 312 and the inside wires 112 and 115 make electrical contact with the connector wires 310, both the DSL and the POTS portions of the VODSL signal flow to the DSL receptacle 212 and the POTS receptacle 210 respectively. Lastly, as the selector switch 307 is changed to a lowermost position where the inside wires 114 and 117 make electrical contact with the connector wires 314, the POTS portion of the VODSL signal can flow to the POTS receptacle 210 but the DSL receptacle 212 receives no signal. It should be appreciated that in the alternative the modular filter jack 300 may include a single receptacle as described in FIG. 2B.

Figure 4:
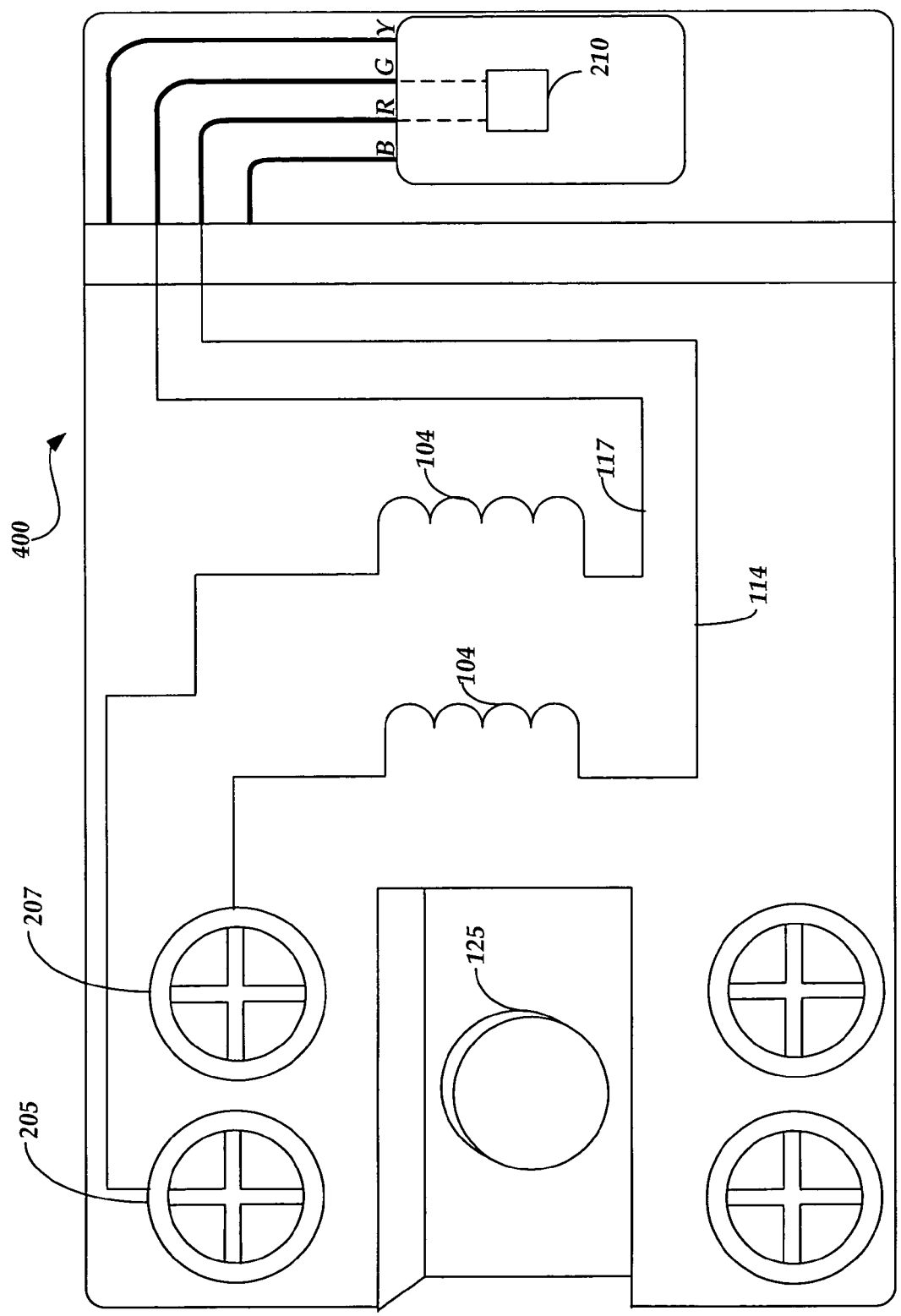
FIG. 4 is a top view of a modular filter jack including circuitry for a dedicated POTS line in accordance with another exemplary embodiment of the present invention.

FIG. 4 is a top view of a modular filter jack 400 including circuitry for a dedicated POTS line in accordance with an exemplary embodiment of the present invention. The modular filter jack 400 includes the inductors 104 operatively associated with the receptacle 210 via the inside wires 114 and 117. The inductors 104 block the DSL portion of the VODSL signal and pass the POTS portion thereby providing a dedicated POTS modular filter jack. The modular filter jack 400 may be used to prevent garbled communication where jacks are dedicated for telephone use.

Figure 5:
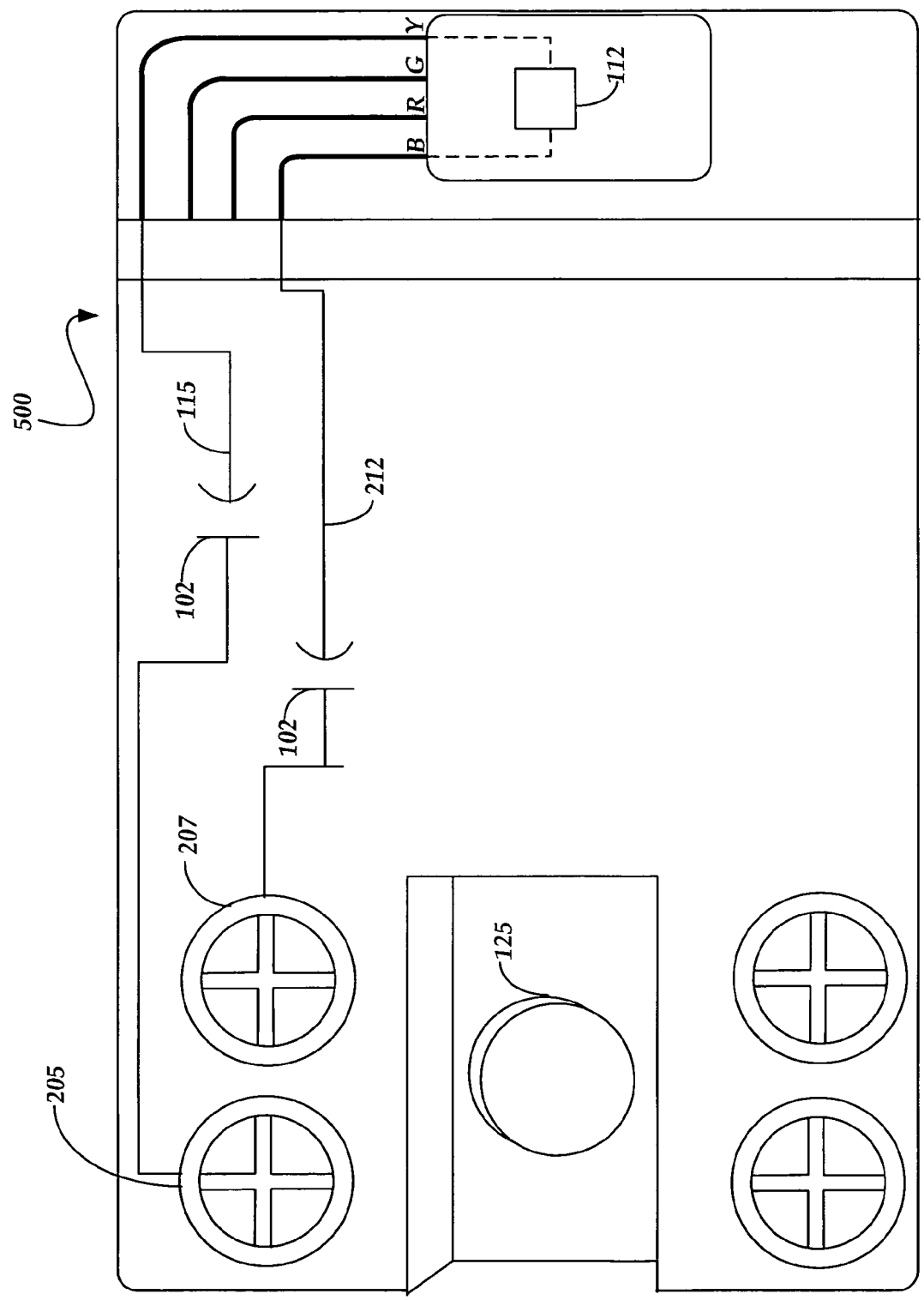
FIG. 5 is a top view of a modular filter jack including circuitry for a dedicated DSL line in accordance with still another exemplary embodiment of the present invention.

FIG. 5 is a top view of a modular filter jack including circuitry for a dedicated DSL line in accordance with yet another exemplary embodiment of the present invention. The modular filter jack 500 includes the capacitors 102 operatively associated with the receptacle 212 via the inside wires 112 and 115. The capacitors 102 block the POTS portion of the VODSL signal and pass the DSL portion, thereby providing a dedicated DSL modular filter jack. The modular filter jack 500 may be used where jacks are dedicated for computer use.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A modular filter apparatus for filtering a voice signal delivered over a digital subscriber line between a first communication circuit and a second communication circuit, the voice signal including analog and digital portions, the modular filter apparatus comprising:
   a connector for receiving the voice signal delivered over the digital subscriber line from a first communication circuit;
   a high pass filter including at least one capacitor operatively associated with the connector to block the analog portion of the voice signal while passing the digital portion;
   a low pass filter including at least one inductor operatively associated with the connector to block the digital portion of the voice signal while passing the analog portion;
   a receptacle operatively associated with the high pass filter and a second receptacle operatively associated with the low pass filter for receiving a connection element to make electrical contact between the first communication circuit and the second communication circuit; and
   a selector switch operativly associated with the high pass filter and the low pass filter and selected changeable to simultaneously or alternately operatively associate the receptacle with the high pass filter and the second receptacle with the low pass filter, thereby providing a modular filter apparatus that serves every selection choice depending on the needs of a user.

2. The modular filter apparatus of claim 1, wherein the analog portion of the voice signal is a plain old telephone system (POTS) signal, and the digital portion of the voice signal is a digital subscriber line (DSL) signal.

3. The modular filter apparatus of claim 2, wherein the second receptacle is operatively associated with the low pass filter, thereby providing a dedicated POTS receptacle.

4. The modular filter apparatus of claim 2, wherein the receptacle is operatively associated with the high pass filter, thereby providing a dedicated DSL receptacle.

5. The modular filter apparatus of claim 2, wherein the selctor switch is adjusted such that the receptacle is operatively associated with the high pass filter, and the second receptacle operatively associated with the low pass filter, thereby providing a dedicated DSL receptacle and a dedicated POTS receptacle.

6. The modular filter apparatus of claim 1, wherein the selector switch is operatively associated with the high pass filter and the low pass filter and selectably changeable to operatively associate the receptacle with the low pass filter and the high pass filter at the same time, thereby providing a selection choice depending on the needs of a user.

7. The modular filter apparatus of claim 1, wherein the second communications circuit comprises one of a computer and a telephone.

8. The modular filter apparatus of claim 1, wherein the receptacle comprises a single receptacle operatively associated with the high pass filter and the low pass filter, the single receptacle for receiving the connection element to make electrical contact between the first communication circuit and the second communication circuit, wherein the second communication circuit comprises one of a communication device requiring the analog portion and a computing device requiring the digital portion.

9. An apparatus for filtering a voice signal delivered over a digital subscriber line between a first communication circuit and a second communication circuit, the voice signal including analog and digital portions, the apparatus comprising:
   an integrated filter and modular jack including:
      means for receiving the voice signal from a central communications circuit;
      a low pass filter including at least one inductor for receiving the voice signal and blocking the digital portion of the signal;
      a high pass filter including at least one capacitor for receiving the digital portion of the voice signal;
      a receptacle operatively associated with the low pass filter for receiving the analog portion of the voice signal, operatively associated with the high pass filter for receiving the digital portion of the voice signal, and for receiving a connection element connecting a communications device or a computing device; and
      a selector switch operatively associated with the high pass filter and the low pass filter and selectably changeable to alternately operatively associate the receptacle with the high pass filter or low pass filter.

10. The apparatus of claim 9, further comprising a housing and means for mounting the apparatus to a mounting surface.

11. A method for filtering a voice signal delivered over a digital subscriber line between a first communication circuit and a second communication circuit, the voice signal including analog and digital portions, the method comprising:
   providing a modular filter jack having a selector switch, the modular filter jack including:
      means for receiving the voice signal from a first communication circuit;
      a high pass filter including at least one capacitor operatively associated with the means for receiving the voice signal to block the analog portion of the voice signal while passing the digital portion;

a low pass filter including at least one inductor operatively associated with the means for receiving the voice signal to block the digital portion of the voice signal while passing the analog portion;

a receptacle operatively associable with at least one of the high pass filter and the low pass filter; and the selector switch operatively associable with the high pass filter and the low pass filter and selectably operative to electrically connect at least one of:

the receptacle to the high pass filter; and the receptacle to the low pass filter; and placing the selector switch in electrical contact with the receptacle therein electrically connecting the receptacle to the high pass filter or the low pass filter.

12. The method of claim 11, further comprising connecting at least one connection element to the receptacle therein operatively associating one of a communications device and a computing device to the first communications circuit.

13. The method of claim 11, wherein the modular filter jack includes a second receptacle operatively associable with at least one of the high pass filter and the low pass filter, further comprising placing the selector switch in electrical contact with the second receptacle so as to electrically connect the second receptacle to at least one of the high pass filter and the low pass filter.

* * * * *